US006618983B1

(12) United States Patent
Spragins

(10) Patent No.: US 6,618,983 B1
(45) Date of Patent: Sep. 16, 2003

(54) INSECT BAITING AND TRAPPING STATION

(75) Inventor: Cisse W. Spragins, Minneapolis, MN (US)

(73) Assignee: Rockwell Laboratories, Ltd., Minneapolis, MN (US)

( * ) Notice: Subject to any disclaimer, the term of this patent is extended or adjusted under 35 U.S.C. 154(b) by 0 days.

(21) Appl. No.: 09/696,360

(22) Filed: Oct. 25, 2000

(51) Int. Cl.[7] ............... A01M 1/10; A01M 1/14; A01M 1/20
(52) U.S. Cl. ............... 43/107; 43/114; 43/131; 43/132.1; 43/136
(58) Field of Search ............... 43/107, 131, 132.1, 43/114, 121; 206/1.5, 461–465, 467

(56) References Cited

U.S. PATENT DOCUMENTS

| | | | | |
|---|---|---|---|---|
| 4,395,842 A | * | 8/1983 | Margulies | 43/114 |
| 4,437,566 A | * | 3/1984 | Szahler | 206/1.5 |
| 4,561,544 A | * | 12/1985 | Reeve | 206/540 |
| 4,765,699 A | * | 8/1988 | Bessinger et al. | 312/334.46 |
| 4,841,669 A | * | 6/1989 | Demarest et al. | 43/131 |
| 4,854,448 A | * | 8/1989 | Hair, II | 206/1.5 |
| 5,048,225 A | * | 9/1991 | Brandli | 43/131 |
| 5,082,137 A | * | 1/1992 | Weinstein | 206/1.5 |
| 5,588,250 A | * | 12/1996 | Chiba et al. | 43/114 |
| 5,771,628 A | * | 6/1998 | Nobbs | 43/121 |
| 5,960,585 A | * | 10/1999 | Demarest et al. | 43/131 |
| 6,021,901 A | * | 2/2000 | Wolfe | 206/1.5 |
| 6,164,010 A | * | 12/2000 | Snell et al. | 43/131 |

FOREIGN PATENT DOCUMENTS

DE  10002817  * 8/2001  ............. A61J/1/03

* cited by examiner

Primary Examiner—Charles T. Jordan
Assistant Examiner—Tara M. Golba
(74) Attorney, Agent, or Firm—Haugen Law Firm PLLP

(57) ABSTRACT

An insect control station for baiting and/or trapping insects that includes a base, a cover, and an insert locked between the base and cover. The insert is preferably a glueboard or tray. The glueboard, to which insects stick, is used for trapping insects in an environment. The tray is used for holding a toxic bait or attractant that the insect takes back to its nest. The tray may also be used to hold glue for trapping purposes. To maximize the safety of the naive person, especially a child, who does not know what an insect control station is, the base and cover are locked to each other with two hand operated keyless locks that operate independently of the other. The keyless locks are recessed relative to the cover at a span having a width greater than a child's hand such that a child may not operate the locks at the same time with one hand. The operating portion of the lock is located on the base so that if two hands operate the two different locks, the cover will not move. Further, the cover must first slide away from the locks before the cover may be removed from the base, whereupon access to the interior is gained. The base and cover are shaped to hold the insert against a floor of the base even if the insect control station is mounted upside down. The insect control station further has a low profile so that it can be tucked into narrow spaces, is rigid so that it can be stepped on without damaging the insert, and includes ramped openings for the crawling insects. The invention further discloses a method for controlling insects.

35 Claims, 5 Drawing Sheets

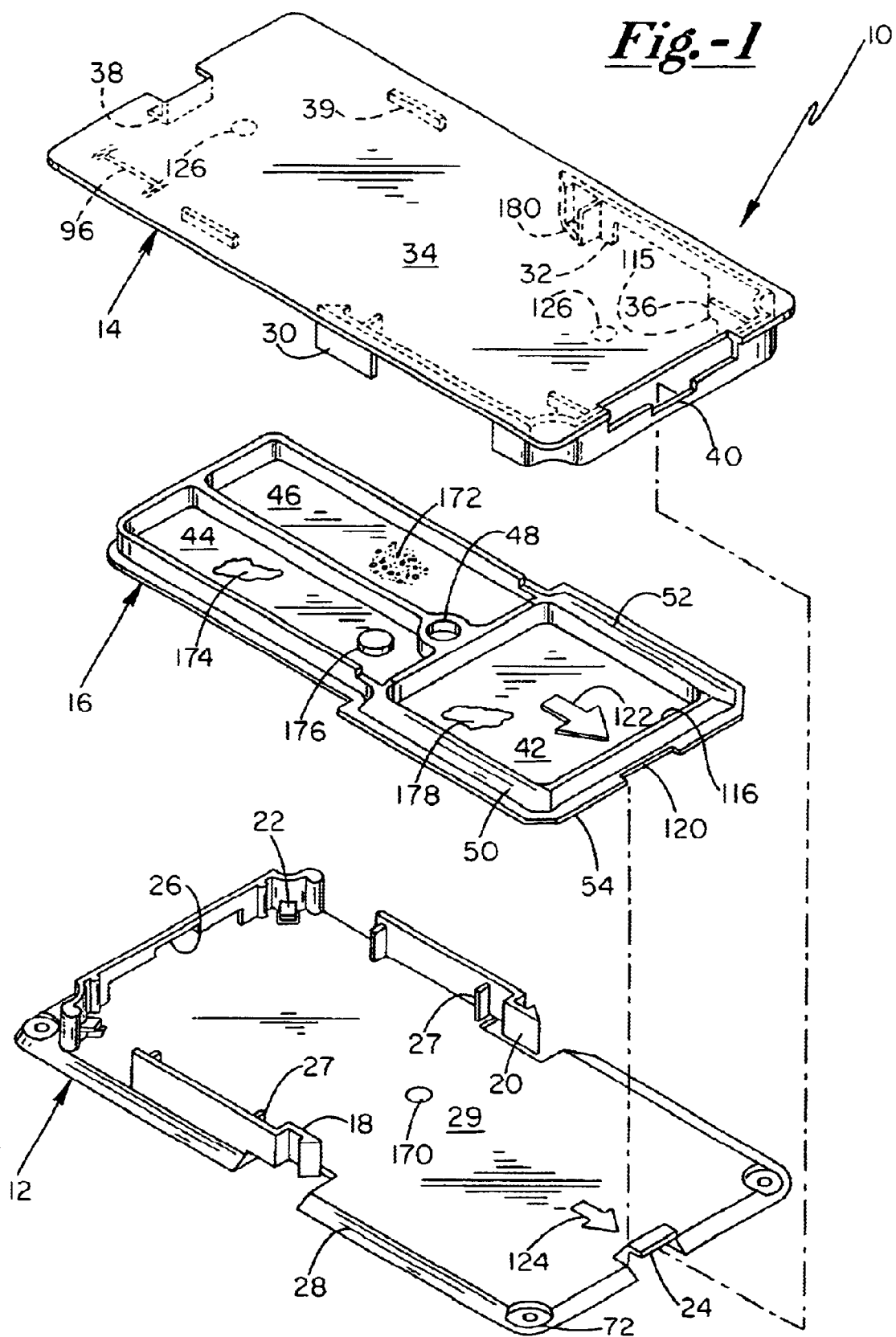

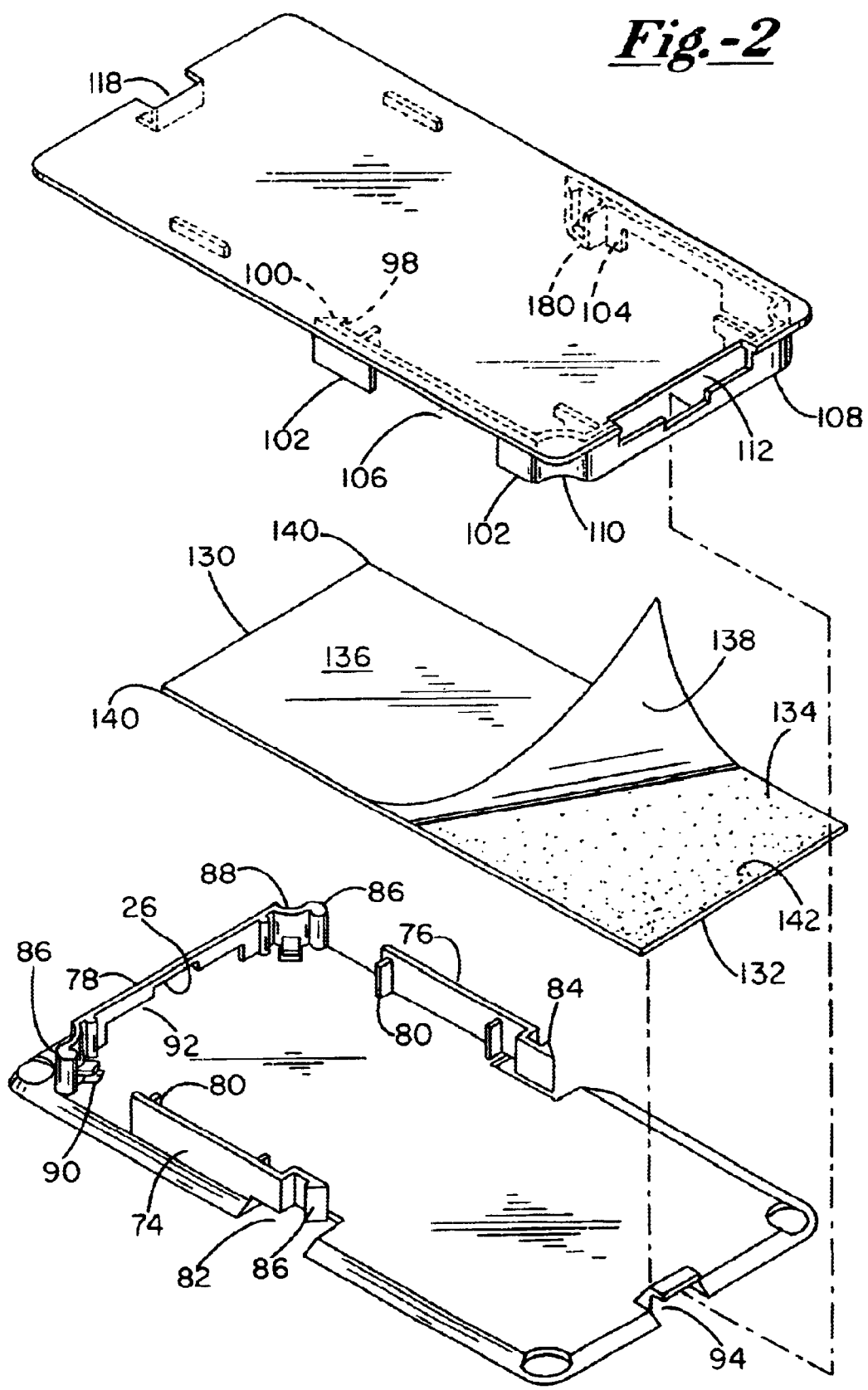

INSECT BAITING AND TRAPPING STATION

BACKGROUND OF THE INVENTION

The present invention relates to an insect control station for baiting and/or trapping insects, more particularly to a tamper-resistant insect control station, and more specifically to a tamper-resistant insect control station with a hand operated keyless lock.

An insect control station is an apparatus for baiting and/or trapping insects in an environment. The apparatus is left unattended in a work, school, home, shopping or entertainment environment or some other inside or outside environment. The apparatus is desirably placed at some location in such environment that is relatively inaccessible. The inside of the apparatus may include glue, to which insects stick, or may include a bait or attractant that the insect takes back to its nest.

Insect control glues, baits and attractants may or may not be toxic. Whether or not a compound is toxic to people or pets is dependent upon the expert consulted, the concentration of the chemical, the time of exposure and other factors. However, access to the glues, baits and attractants by people and pets can be minimized by maximizing the safety features of the means and methods that house the glues, baits and attractants.

Insect control glues, baits and attractants are further subject to dust, moisture and other nonhuman disturbances. For example, dust may stick to the insect control glue and water or moisture may dilute or dissolve the bait or attractant.

SUMMARY OF THE INVENTION

A feature of the present invention is an insect control station. The term "insect" when used herein includes small invertebrates such as but not limited to ants, roaches, beetles, crickets, spiders, mites, flies and moths. The term "insect" when used herein specifically excludes vertebrate animals such as mice and rats.

Another feature of the present invention is the provision in an insect control station, of a reusable insect control station.

Another feature of the present invention is the provision in an insect control station, of a relatively rigid insect control station.

Another feature of the present invention is the provision in an insect control station, of inserts for the insect control station where the inserts include bait tray inserts and trap inserts and where the inserts are replaceable.

Another feature of the present invention is the provision in an insect control station, of the station having multiple holes for pin connectors for securing the station to a surface.

A feature of the present invention is the provision in an insect control station having a base, a cover for the base, and openings between the cover and the base to permit insects to enter the inside of the insect control station, of a resilient catch that is depressed to unlock the cover from the base and that is recessed relative to the cover making it difficult for an unauthorized person to open the insect control station.

Another feature of the present invention is the provision in such an insect control station, of the resilient catch being on the base such that, when the resilient catch is depressed, the cover remains generally motionless whereby another hand must be used to remove the cover from the base.

Another feature of the present invention is the provision in such an insect control station, of the insect control station having two resilient catches, wherein a span between the two resilient catches or the span of the width of the cover is about the width of the hand of an average sized adult male and therefore greater than the width of a hand of a child.

Another feature of the present invention is the provision in such an insect control station, of the two resilient catches being independent of the other such that each of the resilient catches must be opened to remove the cover from the base.

Another feature of the present invention is the provision in such an insect control station, of the base and cover being shaped such that, even if the two hand operated keyless locks are opened at the same time, the cover and base cannot be drawn apart until the cover and base slide apart partially in a common plane. In other words, gaining access to the inside of the control station is a two or three step operation: the hand operated keyless locks are opened by hand, then the cover and base are moved in a sliding motion in a common plane, and then the cover and base are drawn apart.

Another feature of the present invention is the provision in such an insect control station, of the resilient catch having a surface characteristic that is different from adjacent surfaces such that the location of the resilient catch may be determined on the basis of touch.

Another feature of the present invention is the provision in such an insect control station, of an insert in the insect control station that holds glue, bait or other attractant, where the base and cover are shaped to hold the insert to the floor of the base even if the insect control station is turned upside down.

Another feature of the present invention is the provision in such an insect control station, of at least one of the base and cover having a first ramp leading from a surface on which the insect control station is mounted to the opening in the insect control station, of the insert having a receptacle, and of a second ramp on the insert leading from the opening into the receptacle.

Another feature of the present invention is the provision in such an insect control station, of the profile of the insect control station being minimized. In other words, a height of the insect control station is preferably between about a quarter of an inch and about one inch.

Another feature of the present invention is the provision in such an insect control station, of rigid sidewalls between the cover and the base such that, even if the insect control station is stepped on, the inside of the insect control station remains generally undisturbed.

Another feature of the invention is the provision in such an insect control station, of means for mounting the base to a surface which are independent of the cover such that the cover may be removed from the base even if the base is fixed to the surface.

Another feature of the invention is the provision in such an insect control station, of a lock between the base and the cover and a slide between the base and the cover, wherein each of the lock and slide must be operated in turn to release the cover from the base and gain access to the inside of the insect control station.

Another feature of the invention is the provision in such an insect control station, of a lock between the base and the cover and a slide between the base and the cover, wherein each of the lock and slide must be operated to release the cover from the base and gain access to the inside of the insect control station, and wherein the range of the sliding movement is relatively small such that the insect control station may be surrounded on all four sides without undermining the capability of the cover to be slid relative to the base and then drawn off the base.

Another feature of the present invention is the provision in such an insect control station, of a portion of the cover being formed from a see-through plastic such that the bait and/or glue in the insect control station may be inspected without opening the station.

Another feature of the present invention is the provision in such an insect control station of the cover having knock-out portions wherein baits and attractants may be fed into the inside of the insect control station without removing the cover from the base.

An advantage of the present invention is that insect glue, glueboards, lures, baits and attractants are relatively inaccessible as housed in the insect control station.

Another advantage of the present invention is that the inside of the insect control station is relatively accessible for authorized personnel to replace or add glueboards, lures and attractants and/or clean the inside of the insect control station and/or perform other servicing by hand of the inside of the insect control station.

Another advantage of the present invention is that it is keyless and therefore convenient for the service technician. A keyed insect control station is less convenient because the service technician must have the proper key for the proper box. If the service technician does not have the correct key, those insect control stations will go unserviced until the next visit to the service site. Or the service technician may drive back to his or her home base, get the proper key, and return to the service site. Further, the step of using a key is burdensome at a service site having dozens of insect control stations.

Another advantage of the present invention is that, to the naive person or child with no understanding of the insect control station, a tortuous path must be undertaken for gaining access to the inside of the insect control station. The tortuous path is a two or three step operation. First, each of the independent hand operated locks must be opened at the same time. Then the cover must be slid one way. Then the cover must be drawn away from the base in a direction generally normal to the slide.

Another advantage of the present invention is that the two or three step operation requires the use of two hands because the hand operated locks are located on the base and biased to return to the locked position upon removal of the fingers and because the cover remains motionless until slid away from the base.

Another advantage of the present invention is that the insect control station may be mounted in any position. These positions include the upright, sideways and upside down positions. These positions further include angled positions such as in a stairwell on the runner of a staircase.

Another advantage of the present invention is that the glueboard, bait or attractant is housed away and relatively isolated from dust and moisture.

BRIEF DESCRIPTION OF THE DRAWINGS

FIG. 1 is an exploded perspective view of the present insect control station and shows the cover, tray insert and base.

FIG. 2 is an exploded perspective view of the present insect control station and shows the cover, glueboard insert and base.

DESCRIPTION

Figure 3A:
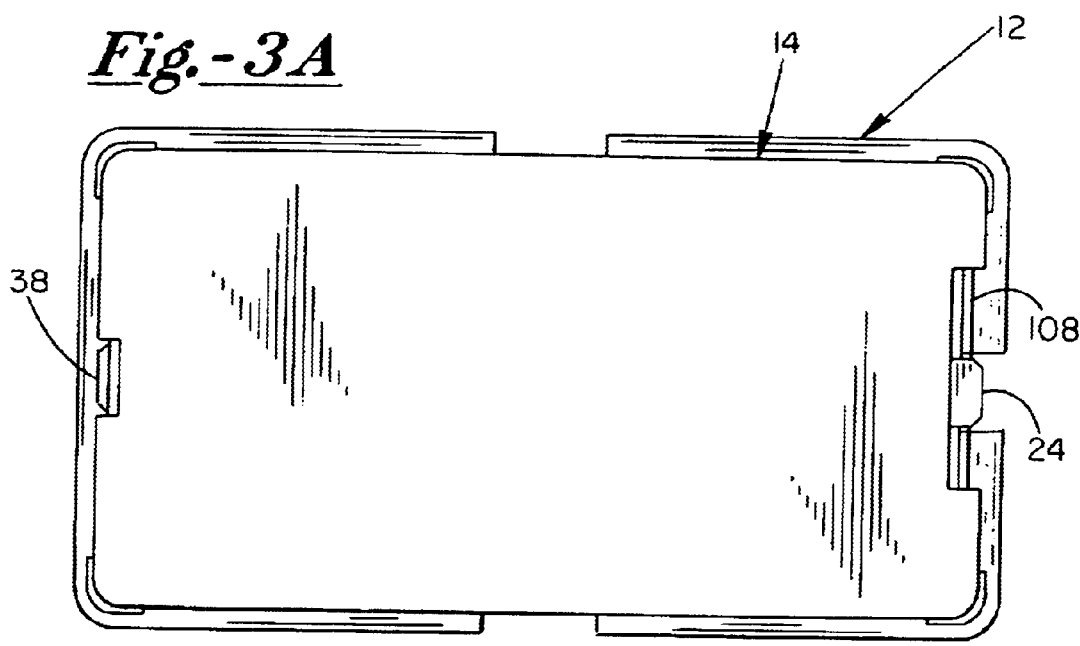
FIG. 3A is a top view of the present insect control station and shows the base and cover engaged to each other in a closed position.

FIG. 1 shows the present insect control station 10. The insect control station 10 generally includes a base 12, cover 14, and tray insert 16.

The base 12 generally includes a first resilient catch portion or lock portion 18 and a second resilient catch portion or lock portion 20, extensions or insert hold down tabs 22, a cover hold down tab 24, a cover tab receptor 26, a pair of slide stops 27, a ramped peripheral edge 28, and a floor 29.

The cover 14 generally includes a first rigid catch portion or lock portion 30 and a second rigid catch portion or lock portion 32, a roof 34, extensions or insert hold down legs 36 depending from the undermost surface or ceiling of the roof 34, a cover hold down tab 38, a pair of slide stops 39, and a base tab receptor 40.

The tray insert 16 generally includes a first receptacle 42, a second receptacle 44, a third receptacle 46, a fourth receptacle 48, a ramp 50 leading into receptacles 42 and 44, a ramp 52 leading into receptacles 42 and 46, and a peripheral hold down edge 54.

Figure 5A:
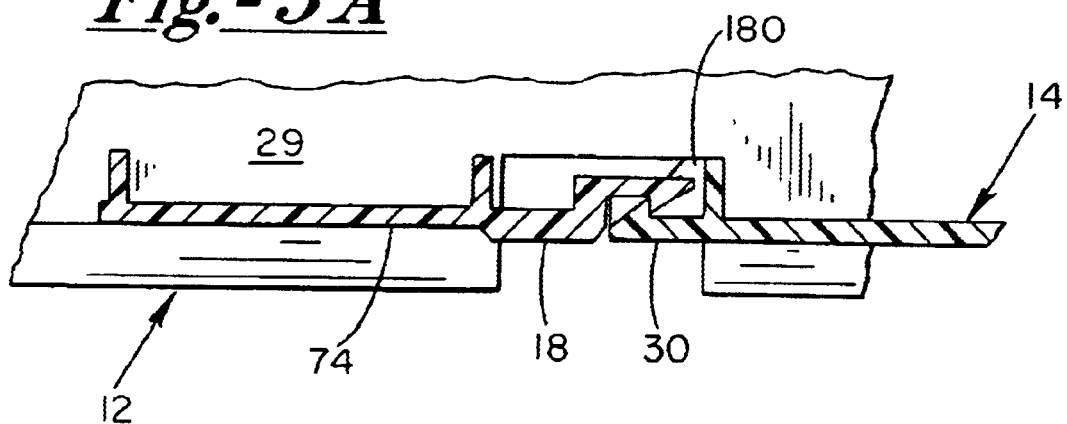
FIG. 5A is a partial section view of the insect control station and shows the closed or locked position for the resilient catch or lock.
Figure 5B:
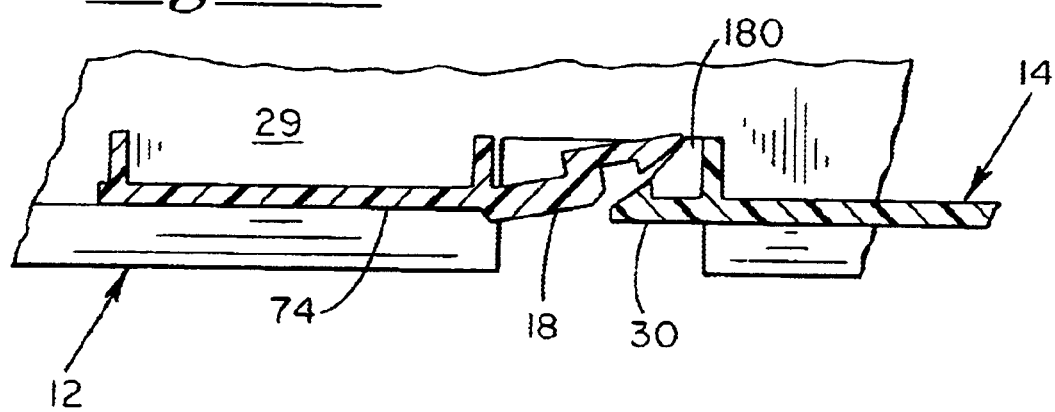
FIG. 5B is a partial section view of the insect control station and shows the resilient catch or lock in the open position, without a sliding of the cover.
Figure 5C:
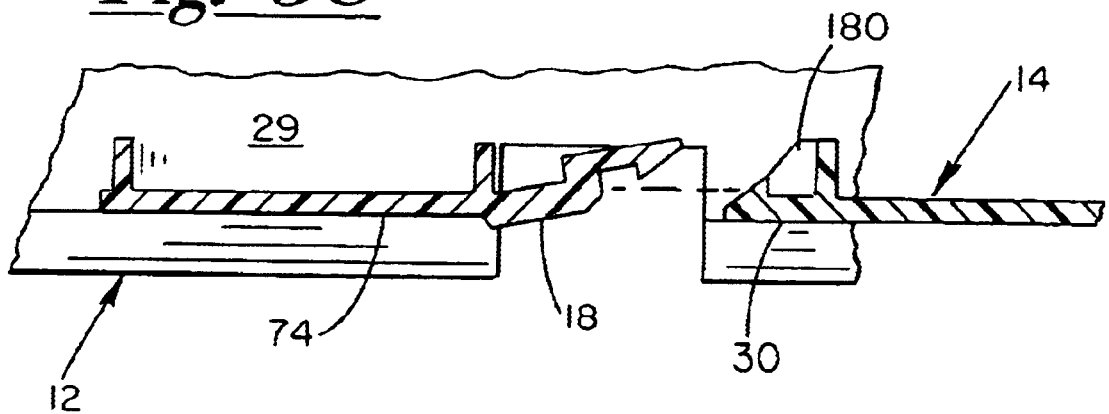
FIG. 5C is a partial section view of the insect control station and shows the resilient catch or lock in the open position, with a sliding of the cover.

Functionally, generally, the first resilient catch portion 18 of the base 12 catches or locks with the first rigid catch portion 30 of the cover 14. First resilient catch portion or lock 18 and first rigid catch portion or lock 30 are referred to as a whole as the first resilient catch or the first lock or the first connection. The second resilient catch portion 20 of the base 12 catches or locks with the second rigid catch portion 32 of the cover 14. Second resilient catch portion or lock 20 and second rigid catch portion or lock 32 are referred to as a whole as the second resilient catch or the second lock or the second connection. The first and second locks are depressed, such as shown in FIGS. 5A, 5B and 5C, and must further be depressed at the same time, whereupon the cover 14 is slid to disengage the tab 38 of the cover 14 from the tab receptor 26 of the base 12 and to disengage the tab 24 of the base 12 from the tab receptor 40 of the cover 14. Then the cover 14 may be removed from the base 12 in a direction perpendicular to the planes of the floor 29 and roof 34. The cover 14, after the locks have been opened and prior to being removed from the base, may slide away from the locked position until stops 39 of the cover 14 abut the stops 27 of the base 12. Then, with the cover 14 removed from the base 12, the tray insert 16 is tucked into the base 12 under the hold down tabs 22 and laid flat on the floor 29. Then the cover 14 is positioned to be slightly offset from the base 12, dropped down on the base 12, and slid shut so that the locks snap shut. As the locks snap shut, the hold down legs 36 confront portions of the tray insert 16 so that each of the ends of the tray insert 16 are held to the floor 29 of the base 12.

Figure 3B:
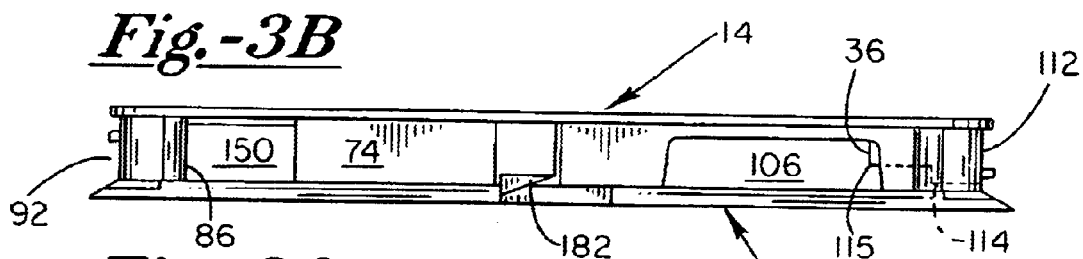
FIG. 3B is a side partially broken away view of the insect control station of FIG. 3A.
Figure 3C:
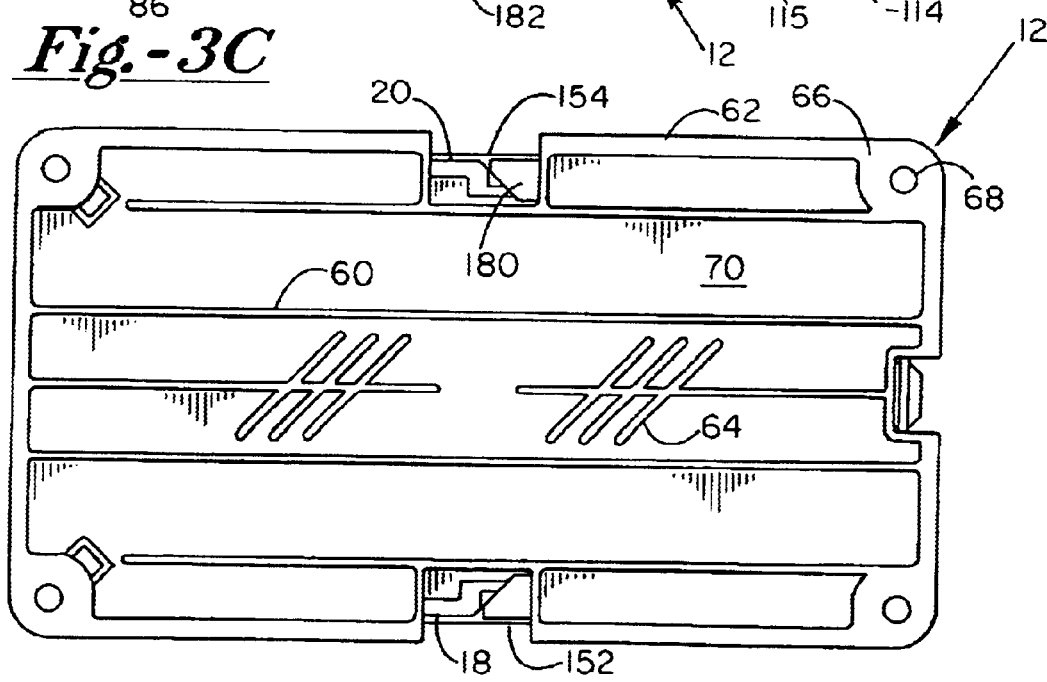
FIG. 3C is a bottom view of the insect control station of FIG. 3A.

More specifically, as shown in FIGS. 1, 2 and 3C, the base 12 includes the floor 29. Floor 29 defines a plane and is relatively flat. Floor 29 is generally formed in the shape of a rectangle. As shown in FIG. 3C, which illustrates the bottom surface of base 12, floor 29 is relatively rigid and includes longitudinal ridges 60. Longitudinal ridges 60 lead into a bottom peripheral edge 62. Longitudinal ridges 60 further lead into two sets of oblique ridges 64. The bottom surfaces of ridges 60, peripheral edge 62 and ridges 64 make contact with a surface on which the insect control station 10 lies or to which the insect control station is attached. Ridges 64 provide a location and sufficient surface area for an attachment means such as double sticky tape. Bottom peripheral edge 62 includes corner platform portions 66 having pin connector holes 68 for pin connectors such as screws or nails for mounting the insect control station 10 to a horizontal, vertical, oblique or overhanging surface such that the insect control station 10 may be mounted horizontally, vertically, obliquely, or in an upside down fashion. Floor 29 further includes a "ceiling" 70 that is spaced from the surface making contact with the ridges 60, bottom peripheral edge 62 and ridges 64. Bottom peripheral edge 62 runs about the entire periphery of the base 12 and forms a seal relative to the spaces formed by the "ceiling" 70 to minimize insects from forming nests underneath the insect control station 10. As shown in FIGS. 1 and 2, floor 29 includes corner cutout portions 72 formed opposite of the corner platforms 66. Portions or platforms 72 receive the heads of pin connectors. Holes 68 extend through the corner cutout portions 72. Floor 29 further includes the ramped peripheral edge 28 that extends about almost the entire periphery of floor 29 with the exception of portions cutout for the hold down tab 24 and for the first and second resilient catch portions or lock portions 18 and 20.

As shown in FIGS. 1 and 2, base 12 further includes sidewalls 74, 76 and 78. Each of the sidewalls 74, 76 and 78 is integrally molded with floor 29 and provide support for the cover 14, and further provide support for the insect control station 10 such as when the station 10 is stepped upon by the foot of a person. Each of the sidewalls 74, 76 and 78 includes an upper surface that makes contact with the cover 14. Sidewalls 74 and 76 are upright and include slide stops 27 which extend from the floor 29 and an inner surface of the sidewalls 74 and 76 and run to the inside of the station 10. Slide stops 27 function as stops to meet the slide stops 39 of the cover 14. Slide stops 27 further function as an integral brace for their respective sidewalls 74, 76, both of which include another brace 80. Brace 80 also extends from the floor 29 and from the inner surface of its respective sidewall 74, 76. Further, as a whole, brace 80 and its respective neighboring brace or stop 27 function as a locator for elongate stop 39 as the cover 14 is dropped into place on top of the base 12 such that the cover 14 is keyed to fit the base 12 in only one way. Sidewall 74 leads integrally into the first resilient catch portion 18 and sidewall 76 leads integrally into second resilient catch portion 20. Catch portions 18 and 20 are cantilevered over cutout portions 82 of the floor 29 via integral triangular braces 182 (shown in FIG. 3B) and are resilient. Such resiliency is provided by the polymer or copolymer or plastic from which the base 12 is molded. Catch portions 18 and 20 are biased outwardly toward the peripheral edge 28 of the base 12. Each of the catch portions 18 and 20 includes a pointed tip or catch 84 and a tapered surface 86 leading into the pointed tip or catch 84. Sidewall 78 includes a pair of integral posts 86 at each of two undulating sidewall corner sections 88. Posts 86 provide further support for the station 10 when the station 10 is stepped on by a person. Insert hold down tabs 22 extend inwardly from the undulating sidewall corner sections 88 and are spaced from the floor 29 or more specifically are spaced from cutout portions 90 formed in the floor 29. Between the undulating sidewall corner section 88, sidewall 78 extends integrally in a linear fashion and includes a hat shaped opening 92 through which insects may enter. Sidewall 78 may also be referred to as an end wall. The uppermost portion of opening 92 forms the receptor 26 for receiving the tab 38 of the cover 14.

Base 12 further includes the cantilevered hold down tab 24 that holds down the cover 14. Tab 24 is cantilevered over cutout portion 94 formed in floor 29.

As shown in FIGS. 1, 2 and 3A, cover 14 includes roof 34. Roof 34 is generally rectangular. Roof 34 is flat and lies in a plane. Roof 34 includes a plurality of ridges 96 extending in the longitudinal direction from adjacent one end of the roof 34 to adjacent the other end of roof 34 in the nature of ridges 60 of base 12. Ridges 96 extend from an underside or ceiling of the roof 34. Each of the stops 39 extends downwardly from a ridge 96.

Further extending from the underside or ceiling of the roof 34 are the first and second rigid catch portions 30 and 32. Each of the first and second rigid catch portions 30 and 32 includes a pointed tip or catch 98 and a tapered or oblique surface 100 leading into the catch 98. Rigid catch portions 30 and 32 form portions of sidewalls 102 and 104. Each of the sidewalls 102 and 104 makes contact with the floor 29 when the cover 14 is on the base 12. Each of the sidewalls 102 and 104 includes an opening 106 through which insects enter. Cover 14 further includes sidewall or end wall 108. End wall 108 includes undulating corner wall sections 110 extending between a pair of posts like posts 86. End wall 108 further includes a inverted hat shaped opening 112. Tab receptor 40 for receiving the tab 24 of the base 12 forms the lowermost portion of the inverted hat shaped opening 112.

Cover 14 further includes extensions or insert hold down legs 36 that depend from the ceiling of the roof 34. Extension 36 is matched with ridge 96 to be integral with and depend from such ridge 96. Extension 36 includes a cutout such that, when the insect control station is on a horizontal surface, extension 36 includes two horizontally extending surfaces at different heights. In other words, as shown in FIG. 3B, a first horizontally extending surface 114 is spaced from floor 29 by a first distance and the other or second horizontally extending surface 115 is spaced from the floor 29 by a second distance greater than the first distance. The first horizontally extending surface 114 confronts the edge 54 of tray insert 16. The second horizontally extending surface 115 confronts the upper surface of an end wall 116 of receptacle 42 of tray insert 16.

Cover 14 further includes the cantilevered hold down tab 38 that cooperates with tab receptor 26 of base 12. Tab 38 is formed at a cutout portion at one end of roof 34. It should also be noted that the other end of roof 34 includes a cutout portion that leads into inverted hat shaped opening 112.

It should be noted that each of base 12 and cover 14 is molded plastic. Accordingly, all of the features and elements of base 12 and cover 14 are integral with each other.

Tray insert 16 is preferably molded from plastic. Tray insert 16 is shaped to be generally tailored to match the floor 29 of the base 12. Tray insert 16 includes a cutout portion 120 to extend about hold down tab 24. The portion of tray insert 16 having receptacle 42 fits on one portion of the floor 29 and the portion of tray insert 16 having elongate receptacles 44 and 46 fits on the floor portion between sidewalls 74, 76 and 78. Tray insert 16 includes molded information 122, specifically an arrow 122, to be matched with molded information 124, specifically an arrow 124, molded into floor 29 of base 12. Tray 16 includes receptacle 48, a rather small receptacle preferred for holding a pheromone tablet. Receptacle 42 is located or aligned directly underneath one of a pair of knockout portions 126 formed in the roof 34 of the cover 14. Knockout portion 126 is a relatively thin portion such that, if desired, portion 126 may be knocked out to form a hole. An inner wall forming a portion of both receptacles 44 and 46 is aligned directly underneath another knockout portion 126. A nozzle may be inserted through holes formed by the knockouts 126 to squeeze bait, such as in gel, powder or granular form, into receptacles 42, 44 and 46 without removing the cover 14 from the base 12. Further, as indicated above ramp 50 leads into two receptacles 42, 44 and ramp 52 leads into two receptacles 42 and 46.

FIG. 2 shows an insect glueboard 130. Insect glueboard 130 includes a base 132, a sticky surface 134 that may contain a chemical lure or attractant, and a peel away covering 136 having a nonstick surface 138. The peel away covering 136 is peeled off the sticky surface 134 prior to or after the glueboard 130 has been inserted into the base 12. The glueboard 130 is inserted into the base 12 by tucking corner edges 140 under the hold down tabs 22. Then the cover 14 is snapped onto the base 12. When so snapped on such that the locks are locked, the first horizontally extending surface 114 that confronts the edge 54 of tray insert 16 also confronts the peripheral edge portion 142 of the glueboard 130.

FIG. 3A shows the cover 14 locked to the base 12. In the locked or closed position, it can be noted that tab 24 of the base 12 holds down the end wall 108 of the cover 14 and that end wall 78 of the base 12 holds down the tab 38 of the cover 14. FIG. 3A further shows that, for the cover 14 to be removed from the base 12, the cover 14 must slide in the "x" direction relative to the base 12. The slide distance required is the longitudinal distance between the distal edge of tabs 24 and 38 and the respective inner surface of the sidewall 108 or sidewall 78. Tabs 24 and 38 may therefore be referred to as slides. FIG. 3A further shows that the perimeter or size of the cover 14 is slightly less than the perimeter or size of the base 12.

FIG. 3B shows first side opening 106 and a second side opening 150. One side opening 150 is formed between sidewall 74 and adjacent post 86 and another side opening 150 is formed between sidewall 76 and adjacent post 86. The insect control station 10 further includes the end openings 92 and 112. The insect control station 10 thus includes six openings for insects: two side openings 106, two side openings 150, one end opening 92 and one end opening 112. FIG. 3B further shows the relatively low profile of the insect control station 10. Preferably, when the base 12 and cover 14 are in the closed position, a height of the insect control station 10 is between about one-quarter of an inch and about one inch. More preferably, when the base 12 and cover 14 are in the closed position, a height of the insect control station 10 is between about one-quarter of an inch and about fifteen-sixteenths of an inch.

FIG. 3C shows that the first resilient catch 18 and second resilient catch 20 are tucked within or recessed within the perimeter of the cover 14. It can be further noted from FIG. 3C that the first resilient catch 18 and second resilient catch 20 are tucked in or recessed within the peripheral edge 28 of the base 12 such that, as to the insect control station 10 as a whole, the locks or catches are recessed within the station 10. More specifically, cover 14 includes a first perimeter edge portion 152 and a second perimeter edge portion 154. The distance between the perimeter edges 152 and 154 is preferably about the width of the hand of an adult male of average size and is thus greater than the width of a hand of a child, especially a small child. Preferably, a distance between the first and second portions 152 and 154 of the periphery is between about two and about eight inches, more preferably between about two and one-half inches and about six inches, and most preferably between about three and about five inches.

Figure 4:
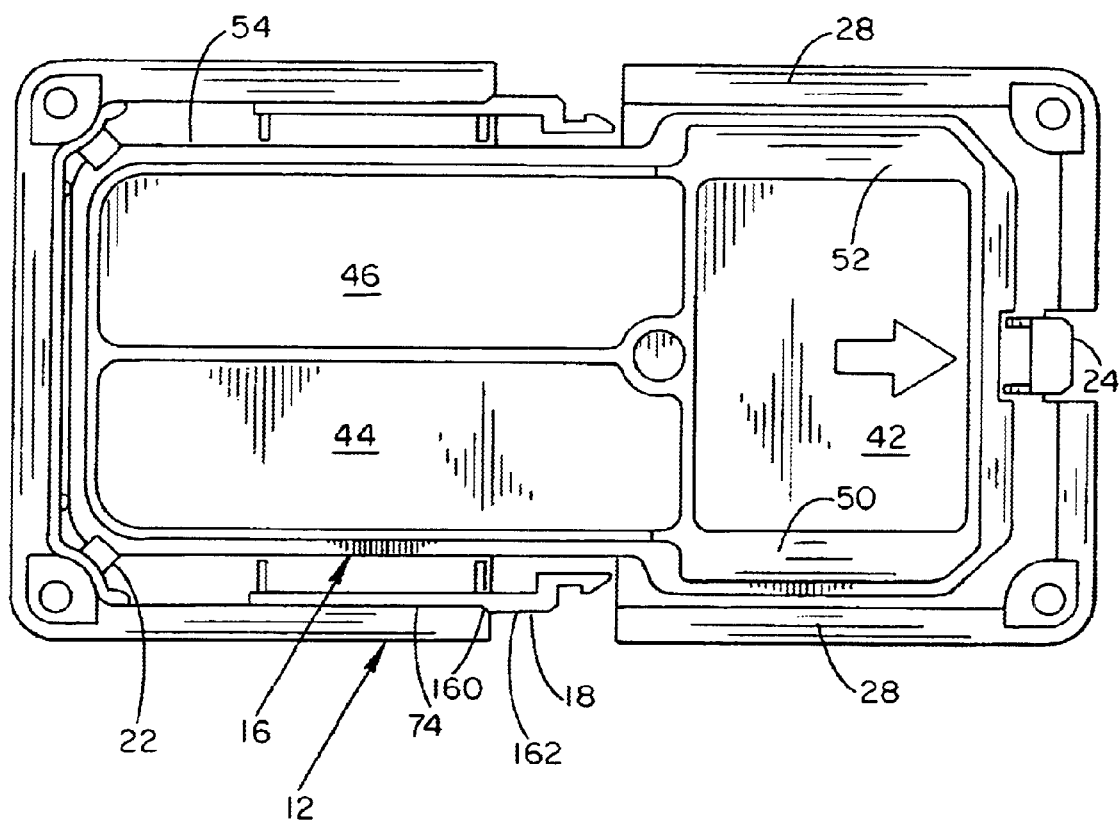
FIG. 4 is a top view of the base shown in FIGS. 1 and 2.

FIG. 4 shows the tray insert 16 partially locked into place with the hold down tabs 22. FIG. 4 further shows that the inner ends of the stops or braces 27 and 80 confront the peripheral edge 54 of the tray insert 16 such that the tray insert 16 is customized to fit the floor 29 and so as to minimize lateral sliding movement (i.e., in the "y" direction) of the tray insert 16 relative to the base 12. FIG. 4 further shows that longitudinal movement (i.e., in the "x" direction) of the tray insert 16 is minimized at one end by end wall 78 and its corner sections 88 and at the other end by the base or support for tab 24. FIG. 4 further shows the alignment between ramp 50 and 52 with the ramped peripheral edge 28 such that an insect has a relatively easy path up ramps to receptacles 42, 44 and 46. FIG. 4 further shows a tapered surface transition 160 that runs from the sidewall 74 (or 76) to a pressing or finger surface 162 of the first resilient catch portion 18 (or the second resilient catch portion 20). This tapered transition 160 is a surface characteristic that permits one opening the locks to identify by touch what is to be depressed with the fingers. Accordingly, one can quickly find the pressing surface 162 by running a finger along sidewall 74 (or 76), feeling the tapered transition 160 and pressing the immediately next surface 162. This immediately next surface is a raised portion (provided by the tapered transition 160) and may be referred to as a "pad."

The insect control station 10 is a fully tamper-resistant insect control station for baiting and trapping insects indoors, and in areas protected from direct rain outdoors. Though very difficult to open without instructions, the insect control station 10 is quick and easy to service with no key needed, even when secured down. In addition, a small child's hand is too small to be able to release the locking prongs or resilient catches and open the station 10. The station 10 is ideally suited for use in child-sensitive areas, such as homes, schools, and day care centers, as well as nursing homes and hospitals, and in other sensitive areas such as food processing, service and storage areas. In addition to providing safety and decreased loss of bait and glue traps, the station 10 projects a clean, professional image for the service personnel and the service company.

To open the insect control station 10, one's left hand may be placed over the left side of the station 10 as the station 10 is oriented in FIG. 3A. Then, the thumb and first finger of the left hand squeeze the first and second resilient catches 18 and 20 toward each other. The thumb and forefinger can by touch identify where to squeeze generally by the cutout portions 82 and specifically by the tapered transition 160. Squeezing too hard with the thumb and forefinger is self-defeating because the thumb and forefinger begin to press into the rigid edges 152 and 154 of the cover 14, thereby holding the cover 14 closed when one is attempting to remove the cover 14. Then, with a proper squeezing, one's right hand may grasp the cover 14 and slide the cover 14 slightly to the right and lift the cover 14 off in the "z" direction, which is the direction perpendicular to the planes in which the roof 34 and floor 29 lie. To replace the cover 14, set the cover 14 on top of the base 12 about one-quarter inch to the right of center and then slide the cover 14 about one-quarter inch to the left to lock or snap the cover 14 to the base 12.

Tray insert 16 is made of a relatively rigid material and fits inside the station 10. Tray insert 16 has four reservoirs or receptacles 42, 44, 46 and 48 which may be used to hold gel, liquid and granular baits for ants, roaches, and other insects such as silverfish, crickets, stored product pests and spiders. Use of multiple baits in the present station 10 increases the effectiveness at least in ant baiting. Another reason for multiple receptacles is that different baits attract different insects. Still another reason for multiple receptacles is that different baits attract different species of insects, such as different species of ants. Yet another reason for multiple receptacles is that, even for one species, different baits are effective at different times of the day or night, month or year. Glue may be used in any of the reservoirs or receptacles, but glue is preferred for use in ramped receptacle 42, to which access is easy for the crawling insect. Station 10 may therefore be used at the same time for both trapping purposes (where glue is used, such as in receptacle 42) and baiting purposes (where baits, lures or attractants are used, such as in receptacles 44, 46 and 48). Receptacle 48 is preferred for use as a receptacle for pheromone tablets. Tray inserts 16 may be thrown away to avoid cleaning, but are sufficiently sturdy and rigid to be used repeatedly. It should be noted that the tray inserts 16 may be used alone, without a base 12 and cover 14, when economics so dictate or when a full station 10 is not required.

For trapping-only applications, the station 10 may be fitted with the glueboard 130. The insect control station 10 protects the trap boards or glueboards 130 (and insert tray 16) from moisture, dust and debris, and from disturbance such as getting swept or washed away, crushed, or stolen. Pheromone tablets may be placed directly on the glueboard 130 for enhanced trapping. Four pre-formed corner holes 68, a center knockout hole 170 formed in the floor 29 of the base 12, and spots 64 on the bottom of the base 12 for liquid nails or double-sided tape provide multiple securing options for increased safety and to prevent loss.

FIGS. 1 and 2 show a base 12 and cover 14 having a plastic that one can see through, such as a translucent, clear or transparent plastic. The cover 14 and base 12 may be formed of a plastic that is opaque, translucent or transparent. A plastic that one can see through is preferred for the cover 14 for quick inspection. However, if desired, the plastic of the base 12 and/or cover 14 may be opaque such that the customer (such as a restaurant) may not wish its customers to see the insects that have been trapped or that are feeding in the insect control station. The insect control station 10 is most preferably about six and one quarter inches in longitudinal length, about three and one-half inch in lateral length and about five-eighths of an inch in height.

It should be noted that baits, attractants, traps, and glue may be referred to as insect control characteristics. It should be further noted that the insert tray 16 may be referred to as an insect control station and may be used by itself as a stand alone insect control station.

Baits or attractants may take various forms such as a granular form 172, a gel form 174, or a tablet form 176. A bait may also take a powder form or a liquid form. Glue 178, for trapping insects, is usually a relatively viscous liquid or gel.

The insect control station 10 is insect-sized. In other words, each of the six openings for insects, two side openings 106, two side openings 150, one end opening 92 and one end opening 112, is sufficiently great to permit insects into the station 10 and sufficiently small to bar or minimize entry of an adult sized mouse. The height of each of the openings 92, 106, 112, 150 is preferably between about one-sixteenth of an inch and about three-quarters of an inch, more preferably between about one-sixteenth of an inch and about five-eighths of an inch, even more preferably between about one-sixteenth of an inch and about one-half inches, and most preferably between about one-sixteenth of an inch and about seven-sixteenths of an inch. The length of the openings 92, 106, 112, 150 is preferably as great as possible. The length of the openings though is limited by the preference for sidewalls that prevent a crushing of the station 10 if the station 10 is stepped upon. Generally, the size of the openings 92, 106, 112 and 150 are no greater than insect-sized. Further, the distance between the floor 29 of the base 12 and ceiling of the cover 14 is sufficiently small to bar or minimize regular movement of an adult-sized mouse.

The station 10 may be selectively used for either baiting (such as with baits 172, 174 and 176 as shown in FIG. 1) or trapping (such as with the glueboard 130 as shown in FIG. 2). Or the tray insert 16 may include both a glue and a bait. A bait is a chemical or attractant that may ultimately kill an insect, prevent an insect from reproducing, eating, flying, crawling or that substantially damages a function or sense of the insect. A trap is a chemical or device that contains the insect so as to prevent the insect from getting away such as by flying or crawling. Chemical traps are most preferred. Traps may include baits or attractants so as to lure the insect into the trap. A bait may be toxic or nontoxic.

A method of the present invention includes the steps of providing an insect control station or housing 10, selectively leaving a bait inside of the insect control station 10, and selectively leaving a trap inside of the insect control station 10. The method also includes one or more of the following steps of leaving the bait and trap inside of the station 10 at the same time, excluding mammals such as mice from the inside of the station 10, sizing the openings 92, 106, 112, 150 as indicated above, sizing the height of the station 10 as provided for above such that the station 10 has a low profile, providing an insect-sized station or housing 10, providing a ramp 28 on the station 10, providing commitment ramps 50, 52, and excluding ramps through most of the length of the outer sidewalls for receptacles 44 and 46.

The provision of both a bait and a trap within an insect control station permits the service personnel to determine whether an insect is feeding (i.e., whether bait has been taken) and what type of insect is in the area (since this insect is trapped in the trap). Further, when several different types of bait are in the station, it may be determined what type of bait is being taken.

It should further be noted that the station or housing 10 is insect-sized and that the openings, 92, 106, 112, 150 are insect-sized or, at the most, no greater than insect-sized. The baits and traps left inside of the station or housing 10 are target for and customized for insects. The baits and traps are insect baits and insect traps.

It should further be noted that multiple pin connector holes 68 are preferred. Insect control stations undergo a high degree of trauma. For example, stations are stolen, stepped upon, and hit by floor cleaning devices.

It should further be noted that the inside of the station or housing 10 is insect-sized. More specifically, the distance between the base 12 and the cover 14 is no greater than the size of an insect. More preferably, the distance between the base 12 and cover 14 is sufficiently small to bar or minimize regular movement of an adult sized mouse. In other words, the distance between a plane defined by the base 12 and a plane defined by the cover 14 is preferably between about one-sixteenth of an inch and about three-quarters of an inch, more preferably between about one-sixteenth of an inch and about five-eighths of an inch, even more preferably between about one-sixteenth of an inch and about one-half inches, and most preferably between about one-sixteenth of an inch and about seven-sixteenths of an inch.

As to nonmovement of the cover 14 in the "z" direction when the cover 14 is locked to the station or housing 10, it should be noted that three sets of elements contribute to such nonmovement. A first set of elements is the tab 24 and sidewall 108 found on one end of the station 10. A second set of elements is the tab 38 and end wall 78 found on the other end of the station. The third set of elements are the locks themselves found in the middle portion of the station 10. More specifically, each of the catch portions 30, 32 of the cover 14 includes a braced horizontally extending member 180. Member 180 is integral with its respective catch portion 30, 32. When the cover 14 is grasped, such as when grasped in the middle portion at peripheral edge portions 152, 154, members 180 bring pressure to bear on the underside of base catch portions 18 and 20, thereby preventing the cover catch portions 30 and 32 from slipping vertically through the base catch portions 18 and 20 and thereby preventing the middle of the cover 14 from bowing outwardly. It should be further noted that triangular brace 182 on base catch portions 18 and 20 aids in resisting the catch portions 18 and 20 from being pushed up in the vertical direction by members 180 when an attempt is made to pull up the cover 14 when the catches are engaged. Station 10 accordingly presents four peripherally distributed sets of surfaces that bring pressure to bear against each other when an attempt is made to remove the cover in the "z" direction, with one set of surfaces being on one end of the station 10, a second sets of surfaces being one the other end of the station 10, and two sets of surfaces being in a middle portion of the station 10.

The insect control station 10 may bait and trap both crawling and flying insects. Crawling insects include ants, roaches, and other crawling insects such as silverfish, crickets, stored product pests and spiders. Flying insects include wasps, bees, the common house fly, the biting horse fly, and the fruit fly. It should be noted that many flying insects also crawl.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. An insect control station, comprising:

a) a base, wherein the base comprises a floor;

b) a cover for the base, wherein the cover comprises a ceiling, wherein the cover comprises a periphery, and wherein the base and cover define an inside of the insect control station;

c) an opening in at least one of the base and cover to permit insects to enter the inside of the insect control station through the opening;

d) a first resilient catch between the base and the cover, i) wherein the first resilient catch engages the base and cover to each other when the first resilient catch is in a closed position, ii) wherein the first resilient catch includes a bias toward the closed position, iii) wherein the first resilient catch comprises a pressing surface upon which pressure is brought to bear by hand for depressing the first resilient catch against the bias and thereby opening the first resilient catch to an open position whereupon a process is initiated for opening the cover for gaining access to the inside of the insect control station, and iv) wherein said pressing surface is between the floor of the base and the ceiling of the cover, is in the inside of the insect control station, and is recessed relative to the periphery of the cover to maximize the inaccessibility of a finger to depress the first resilient catch so as to minimize unauthorized access to the inside of the insect control station;

e) wherein, after opening said first resilient catch to said open position, said base and cover are slideable relative to each other and subsequently removable from each other; and f) an insect control characteristic in the insect control station.

2. The insect control station according to claim 1, wherein the base includes the first resilient catch such that the base includes the pressing surface and wherein, when the pressing surface is depressed, the cover remains generally motionless until moved by hand such that removing the cover from the base is a two handed operation with one hand depressing the pressing surface and with the other hand moving the cover.

3. The insect control station according to claim 1, wherein the periphery of the cover comprises first and second opposing portions, wherein the first resilient catch is recessed relative to the first opposing portion, wherein the insect control station further comprises a second resilient catch, wherein the second resilient catch is recessed relative to the second opposing portion, and wherein a distance between the first and second opposing portions is generally about the width of a hand of an average sized adult male whereby a child is less likely able to depress the first and second resilient catches at the same time.

4. The insect control station according to claim 1, wherein the base and cover as a whole includes an "x" direction, a "y" direction, and a "z" direction, with each of the directions being perpendicular to each of the other directions, wherein each of the base and cover comprises an opposing surface, with the opposing surfaces opposing each other when the base and cover are engaged and the first resilient catch is in the closed position, and:

a) wherein, when the first resilient catch is in the closed position, movement of the base and cover relative to each other is minimized in the "x, y and z" directions;

b) wherein, when the first resilient catch is depressed such that the first resilient catch is in the open position, the base and cover are slideable relative to each other in the "x" direction;

c) wherein the base and cover include stops, wherein said base and cover are relatively slideable in the "x" direction until said stops abut each other;

d) wherein, when the base and cover slide relative to each other in the "x" direction, the opposing surfaces become separate relative to the other in the "z" direction such that each of the opposing surfaces may move away from each other in the "z" direction and such that the cover and base may move away from each other in the "z" direction such that the insect control station requires a two step operation for removal of the cover from the base;

e) wherein the two-step operation comprises first depressing the pressing surface so as to release the first resilient catch to enable the cover and base to slide relative to each other in the "x" direction; and f) wherein the two-step operation comprises second sliding the cover and base relative to each other in the "x" direction to move the opposing surfaces away from each other in the "z" direction so as to enable the cover and base to be separated from each other in the "z" direction.

5. The insect control station according to claim 1, wherein the base generally defines a plane and wherein the cover generally defines a plane and wherein the base and cover comprise:

a) means for preventing the base and cover from being drawn apart on a line normal to both of the planes upon depressing and opening the first resilient catch;

b) means for permitting a sliding of the base and cover relative to each other in one direction upon depressing and opening the first resilient catch and means for stopping said sliding in said one direction; and c) means for permitting the base and cover to be drawn apart on the line after the base and cover have been slid relative to each other such that the inside of the insect control station is accessed after two distinct steps.

6. The insect control station according to claim 1, wherein at least one of the base and cover comprises a sidewall, wherein the sidewall is between the base and cover, wherein the sidewall includes an outer surface, and wherein the pressing surface of the first resilient catch comprises a surface characteristic different from the outer surface of the sidewall such that the pressing surface of the first resilient catch can be distinguished from the outer surface of the sidewall on the basis of touch.

7. The insect control station according to claim 1, wherein the first resilient catch comprises a catch portion on the base and a catch portion on the cover, wherein one of the catch portions comprises a tapered surface such that, when the cover and base are being moved toward the closed position, the first resilient catch is drawn against said bias by said tapered surface until the catch portions catch each other.

8. An insect control station, comprising:

a) a base;

b) a cover for the base, wherein the cover comprises a periphery, and wherein the base and cover define an inside of the insect control station;

c) openings in at least one of the base and cover to permit insects to enter the inside of the insect control station;

d) a first direction of movement between the base and the cover;

e) a second direction of movement between the base and the cover;

f) a connection between the base and the cover, wherein the connection includes a closed position and an open position;

g) wherein, when the connection is in the closed position and before the base and cover have been moved in the first direction, the base, cover and connection are shaped to prevent movement between the base and the cover in the first and second directions;

h) wherein, when the connection is in the open position, the base, cover and connection are shaped:
   i) to allow movement between the base and cover in the first direction from a first location;
   ii) to stop movement between the base and cover in the first direction at a second location; and
   iii) to prevent movement between the base and cover in the second direction;

i) wherein, when the connection is in the open position and after the base and cover have been moved in the first direction, the base, cover and connection are shaped to allow movement between the base and cover in the second direction whereby the base and cover may be drawn away from each other to gain access to the inside of the insect control station; and j) an insect control characteristic in the insect control station.

9. An insect control station, comprising:

a) a base, wherein the base includes a floor;

b) a cover for the base, wherein the cover comprises a periphery, and wherein the base and cover define an inside of the insect control station, wherein the cover slidingly engages the base;

c) openings in at least one of the base and cover to permit insects to enter the inside of the insect control station;

d) an insert for being inserted into the inside of the insect control station, with the insert having an insect control characteristic, wherein the insert includes an insert portion having a thickness, wherein the insert is shaped to confront the floor of the base;

e) a first extension extending from the base, wherein the first extension is spaced from the floor by a distance generally about the thickness of the insert portion when the base and cover are in a closed position, and wherein the first extension confronts the insert portion when the insert confronts the floor of the base such that, even when the insect control station is turned upside down, the insert remains on the floor of the base;

f) wherein the insert includes two opposite ends;

g) wherein the first extension engages one of the opposite ends of the insert when the cover is engaged to the base and when the cover is off the base; and h) wherein a further extension extends from the cover and terminates short of the floor when the base and cover are in the closed position, wherein said further extension confronts the insert as the base and cover slide into the closed position, wherein said further extension engages the other of the opposite ends when the base and cover are in the closed position.

10. The insect control station according to claim 9, wherein the first extension extends from the base and forms a female receptor relative to the floor of the base, and wherein the insert portion is insertable into the female receptor.

11. The insect control station according to claim 9, wherein the insert includes first and second insert portions, wherein the first and second insert portions include different heights, wherein said further extension includes two different lengths, and wherein said different lengths are sufficient to confront the first and second insert portions at said different heights.

12. An insect control station, comprising:

a) a base, wherein the base comprises a floor;

b) a cover for the base, wherein the cover comprises a ceiling, wherein the cover comprises a periphery, and wherein the base and cover define an inside of the insect control station;
c) first and second sidewalls between the base and the cover, wherein the first and second sidewalls oppose one another, and wherein the first and second sidewalls extend from at least one of the base and cover;
d) openings in at least one of the sidewalls to permit insects to enter the inside of the insect control station;
e) first and second hand operated keyless locks between the floor of the base and the ceiling of the cover, wherein the base and cover define a closed position when the first and second hand operated keyless locks are locked and wherein the base and cover define an open position when the first and second hand operated keyless locks are open;
f) wherein the first and second hand operated keyless locks are opened by pressing the hand operated keyless locks toward the inside of the insect control station, wherein the first hand operated keyless lock forms at least a portion of the first sidewall and wherein the second hand operated keyless lock forms at least a portion of the second sidewall;
g) wherein the first hand operated keyless lock is recessed relative to a first portion of the periphery and wherein the second hand operated keyless lock is recessed relative to a second portion of the periphery;
h) wherein each of the first and second hand operated keyless locks are independent of the other of the hand operated keyless locks such that the open position of the base and cover is attainable only by operating the first and second hand operated keyless locks at the same time; and
i) an insect control characteristic in the insect control station.

13. The insect control station according to claim 12, wherein a distance between the first and second portions of the periphery is about equal to the width of a hand of an adult male.

14. The insect control station according to claim 12, wherein a distance between the first and second portions of the periphery is between about two and about eight inches.

15. The insect control station according to claim 12, wherein a distance between the first and second portions of the periphery is between about two and one-half inches and about six inches.

16. The insect control station according to claim 12, wherein a distance between the first and second portions of the periphery is between about three and about five inches.

17. The insect control station according to claim 12, wherein when the base and cover are in the closed position a height of the insect control station is between about one-quarter of an inch and about one inch.

18. The insect control station according to claim 12, wherein the base includes a floor that lies generally in a plane, wherein the cover includes a ceiling that lies generally in a plane, and wherein a distance between the planes is sufficiently small to minimize regular movement of an adult sized mouse.

19. An insect control station, comprising:
a) a base, wherein the base includes a floor and a periphery;
b) a cover for the base, wherein the cover comprises a periphery, and wherein the base and cover define an inside of the insect control station;
c) openings in at least one of the base and cover to permit insects to enter the inside of the insect control station;
d) wherein the base and cover are lockable to and unlockable from each other;
e) wherein at least one of the base and cover includes a first ramp leading from one of the peripheries to the inside of the insect control station, with the first ramp leading into one of the openings;
f) an insert for being inserted into the inside of the insect control station, wherein the insert is shaped to confront the floor of the base, wherein the insert includes an insect control characteristic, wherein the insert includes a periphery, a first receptacle within the periphery, and a second ramp leading from the periphery of the insert to the first receptacle; and
g) wherein the first ramp leads into the second ramp to maximize ease of entry into the first receptacle for a crawling insect.

20. The insect control station according to claim 19, wherein the insert comprises a second receptacle and a wall between the first and second receptacle, and wherein the first ramp leads into the second receptacle as well as the first receptacle.

21. An insect control station, comprising:
a) a base;
b) a cover for the base, wherein the base and cover define an inside of the insect control station;
c) an opening in at least one of the base and cover to permit insects to enter the inside of the insect control station through the opening;
d) a hand operated keyless lock between the base and cover that must be operated prior to removing the cover from the base;
e) a slide between the base and the cover, wherein the slide is operational after the hand operated keyless lock has been opened, and wherein the slide must be operated prior to opening the station;
f) a stop between the base and the cover to stop sliding of the slide after the hand operated keyless lock has been opened; and
g) an insect control characteristic in the insect control station.

22. An insect control station, comprising:
a) a piece of molded plastic;
b) a peripheral edge about the piece of molded plastic;
c) first, second and third receptacles in the piece of molded plastic;
d) a first ramp leading from the peripheral edge directly to the first and second receptacles;
e) a second ramp leading from the peripheral edge directly to the first and third receptacles whereby insects may easily gain access to all three receptacles; and
f) an insect control characteristic in the insect control station.

23. The insect control station according to claim 22, and further comprising a fourth receptacle, with the fourth receptacle being circular.

24. An insect control station, comprising:
a) a mouse-excluding, insect-sized housing having a base, a cover, and an inside, wherein the housing is relatively rigid, wherein the housing is reusable, wherein the housing comprises plastic, and wherein the housing comprises an extending surface;
b) a first replaceable insert for the inside of the housing, wherein the first replaceable insert is locatable within the housing at a first location, and wherein the first replaceable insert comprises an insect bait tray;

c) a second replaceable insert for the inside of the housing, wherein the second replaceable insert is locatable within the housing at said first location instead of the first replaceable insert and at a different time than the first replaceable insert, wherein the second replaceable insert comprises an insect trap, wherein the first insert includes an insect characteristic different from the second insert and wherein one of the first and second replaceable inserts is selectively placed within the housing;

d) wherein the insect bait tray comprises a piece of molded plastic, a peripheral edge about the piece of molded plastic, and first and second receptacles in the piece of molded plastic;

e) wherein the insect trap comprises an insect glueboard comprising a base, a sticky surface, and a peel away covering peelable off the sticky surface, and a peripheral edge; and f) wherein the extending surface of the housing confronts the peripheral edge portion of the insect bait tray when the insect bait tray is in the housing and wherein the extending surface of the housing confronts the peripheral edge of the insect glueboard when the insect glueboard is in the housing.

25. The insect control station according to claim 24, wherein the cover includes a locked position, an open position, and a sliding position between the locked and open positions.

26. The insect control station according to claim 24, wherein the housing includes multiple pin connector holes for connecting the housing to a surface with pin connectors.

27. The insect control station according to claim 24, wherein at different times each of the first and second replaceable inserts are engagable within the housing on the base such that, even if the housing is turned upside down, the first and second replaceable inserts lie on the base.

28. The insect control station of claim 24, wherein the first replaceable insert includes both a bait and a trap whereby one servicing the station may take note of the type of insect that has taken the bait.

29. The insect control station of claim 24, wherein the first insert includes a first bait, a second bait different from the first bait, and a trap whereby one servicing the station may take note of a particular trapped insect and which of the first and second bait has been taken.

30. An insect control station, comprising:

a) a mouse-excluding, insect-sized housing having a base, a cover, and an inside, wherein the housing is relatively rigid, wherein the housing is reusable, wherein the housing comprises plastic, wherein the housing comprises an extending surface, and wherein the cover may be moved by hand relative to the base such that the inside of the housing can be accessed;

b) a first replaceable insert for the inside of the housing, wherein the first replaceable insert is locatable within the housing at a first location, and wherein the first replaceable insert comprises an insect bait tray;

c) a second replaceable insert for the inside of the housing, wherein the second replaceable insert is locatable within the housing at said first location at a different time from the first replaceable insert, wherein the second replaceable insert comprises an insect trap, wherein the first replaceable insert includes an insect characteristic different from the second replaceable insert and wherein one of the first and second replaceable inserts is selectively placed within the housing;

d) wherein the insect bait tray comprises a piece of molded plastic, a peripheral edge about the piece of molded plastic, and first and second receptacles in the piece of molded plastic;

e) wherein the insect trap comprises an insect glueboard;

f) wherein the extending surface of the housing confronts the peripheral edge portion of the insect bait tray when the insect bait tray is in the housing and wherein the extending surface of the housing confronts the peripheral edge of the insect glueboard when the insect glueboard is in the housing;

g) wherein the base includes multiple pin connector receptors to minimize theft and displacement of the insect control station, wherein each of the pin connector receptors can receive a pin connector which engages the housing to a surface;

h) wherein the base includes a periphery, wherein the cover includes a periphery, and wherein at least one of the base and cover includes a first ramp leading from one of the peripheries to the inside of the insect control station;

i) an extension extending from the base, wherein the extension forms a female receptor relative to the floor of the base, and wherein the insect glueboard is insertable into the female receptor; and j) wherein the cover comprises a see-through plastic portion such that the inside of the housing can be seen whereby, without opening the cover, a service technician can determine:

i) when the replaceable insert includes bait, whether bait has been taken, and ii) when the replaceable insert includes a trap, if insects have been trapped.

31. An insect control station, comprising:

a) a mouse-excluding, insect-sized housing having a base, a cover, and an inside, wherein the housing is relatively rigid, wherein the housing is reusable, wherein the housing comprises plastic, and wherein the cover may be moved by hand relative to the base such that the inside of the housing can be accessed;

b) a first replaceable insert for the inside of the housing, wherein the first replaceable insert is locatable within the housing, and wherein the first replaceable insert comprises an insect bait tray;

c) a second replaceable insert for the inside of the housing, wherein the second replaceable insert is locatable within the housing at a different time from the first replaceable insert, wherein the second replaceable insert comprises an insect trap, wherein the first replaceable insert includes an insect characteristic different from the second replaceable insert and wherein one of the first and second replaceable inserts is selectively placed within the housing;

d) wherein the insect bait tray comprises a piece of molded plastic, a peripheral edge about the piece of molded plastic, and first and second receptacles in the piece of molded plastic;

e) wherein the insect trap comprises an insect glueboard;

f) wherein the housing confronts peripheral edge portions of the insect bait tray when the insect bait tray is in the housing and wherein the housing confronts peripheral edge portions of the insect glueboard when the insect glueboard is in the housing;

g) wherein the base includes multiple pin connector receptors to minimize theft and displacement of the insect control station, wherein each of the pin connector receptors can receive a pin connector which engages the housing to a surface;

h) wherein the base includes first, second, third and fourth sides, wherein the first and second sides of the base includes a ramp leading to the inside of the housing;

i) an extension extending from the base, wherein the extension forms a female receptor relative to the floor of the base, and wherein said trap is insertable into the female receptor; and j) wherein the cover comprises a see-through plastic portion such that the inside of the housing can be seen whereby, without opening the cover, a service technician can determine:
  i) when the replaceable insert includes bait, whether bait has been taken, and
  ii) when the replaceable insert includes a trap, if insects have been trapped.

32. The insect control station of claim 31, wherein the third side of the base includes a ramp leading to the inside of the housing.

33. The insect control station of claim 31, wherein first, second, third and fourth corner posts are disposed between the cover and the base whereby the insect control station is supported when stepped upon.

34. The insect control station of claim 31, wherein the base includes a bottom surface forming a space where insects may form nests, and wherein the base includes a peripheral seal to minimize chances of insects forming nests in said space.

35. The insect control station of claim 31, wherein the base includes a bottom surface having a set of longitudinal ridges confronting a surface on which the insect station lies.

* * * * *